United States Patent [19]

Spencer, deceased et al.

[11] Patent Number: 5,252,111

[45] Date of Patent: Oct. 12, 1993

[54] EXPANDABLE MULTI-PLY OBLIQUELY ORIENTED HONEYCOMB FILTER MEDIA

[76] Inventors: Victor V. Spencer, deceased, late of Tillsonburg; by Mary Spencer, executrix, 4 Highland Street, Tillsonburg, Ontario, Canada, N4G 2E9; Leonid A. Bagrin, 257 Burlington, London, Ontario, Canada, N5Z 3W3

[21] Appl. No.: 937,699

[22] Filed: Sep. 1, 1992

[51] Int. Cl.⁵ .............................................. B01D 46/12
[52] U.S. Cl. .......................................... 55/489; 55/496
[58] Field of Search ................. 55/488, 489, 497, 440, 55/500, 521, 522, 496

[56]        References Cited
U.S. PATENT DOCUMENTS 3,909,224  9/1975  Spencer .................................. 55/482
3,949,651  4/1976  Spencer .................................. 156/197

FOREIGN PATENT DOCUMENTS 752027  7/1956  United Kingdom ................... 55/489

Primary Examiner—Tim Miles

[57] ABSTRACT

A multi-ply expandable filter media formed of obliquely oriented honeycomb organized into a ply or run having expandable honeycomb cells with one run oriented at, preferably an acute angle, of 30° to 60° relative to the cells of an adjacent run. Preferably, the respective plys or runs are arranged in relative parallel planes defining a planar space therebetween. There is provided means for collapsing the filter media into a closed compressed, transportable state, and when ready for use as a filter media, to allow the same to be expanded and pulled open and to be constrained in an preselected, open, expanded position so that the cross-sectional area of each cell is thereby substantially increased. In this manner, the juxtaposed, open plys allow directional change for airflow flowing through the filter media, encouraging deposits of air-borne material to become attached to the wall surfaces of the family of cells of each run or ply. To enhance adhesion, an adhesive may be sprayed over the cell walls.

3 Claims, 3 Drawing Sheets

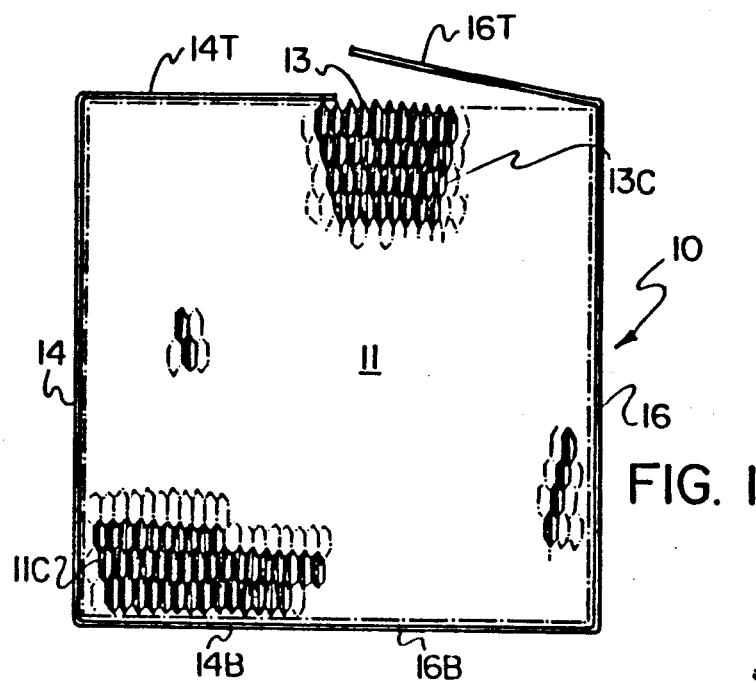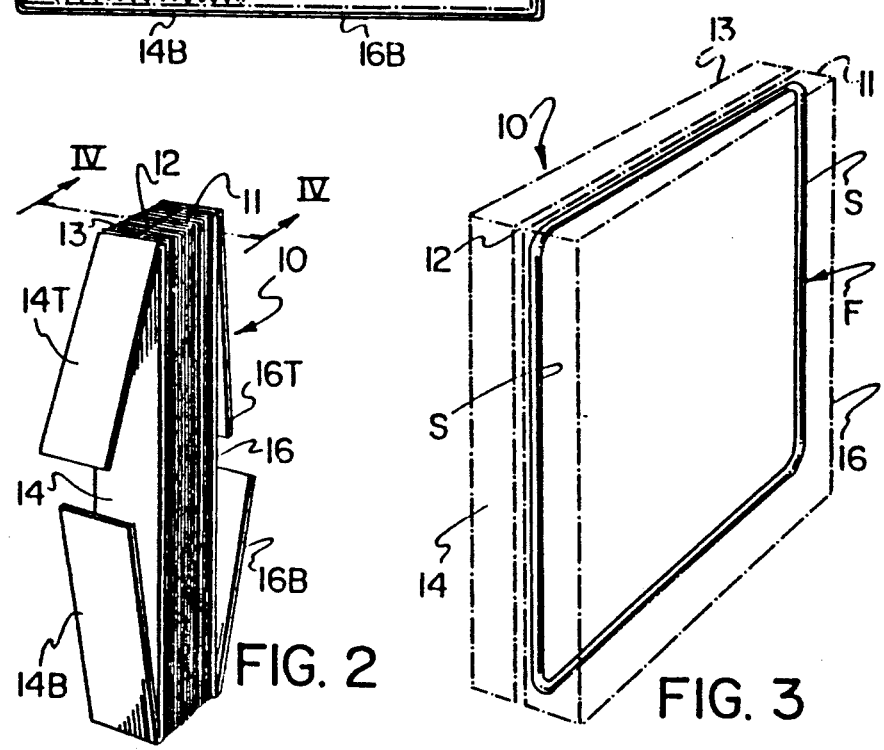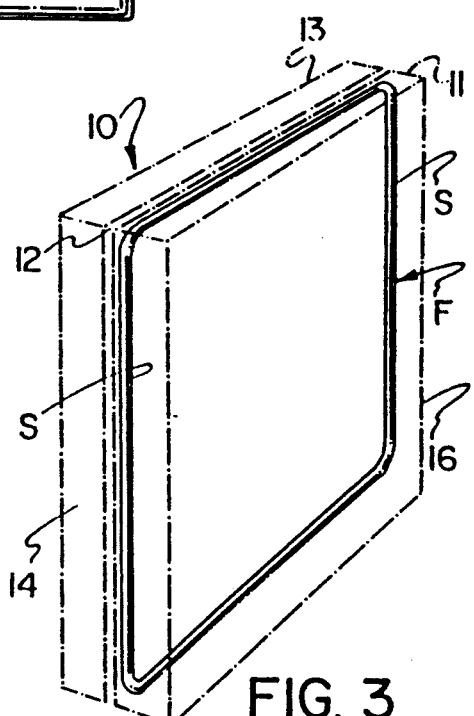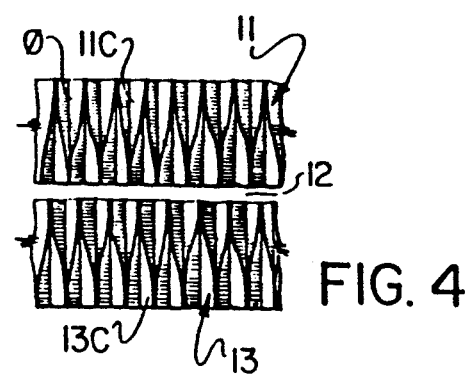

EXPANDABLE MULTI-PLY OBLIQUELY ORIENTED HONEYCOMB FILTER MEDIA

This invention relates to an expandable multi-ply obliquely oriented honeycomb filter media, particularly suitable as a paint arrestor. Each of the cells within a ply is expandable so that the cross-sectional area of the cell may be small whereupon the cell density is greater, or large, as may be desired.

It is known in the art to use expandable paper products such as honeycomb as an inexpensive and effective paint overspray control media or paint arrestor. Each paint arrestor is placed in the exhaust airflow of a paint booth and the like. Paint spray residuals that do not adhere to the painted article are entrained in the air flow of the exhaust porting from the paint booth, through the paint arrestor. For an inexpensive paint arresting media, expandable paper products have been used, but such prior art arrestors are fabricated into a rigid frame and sold as a rigid frame filter pad for inclusion in the downstream airflow emanating from the paint booth or painting station within a manufacturing facility. The prior art arrestors with fixed frames snap into a holding grid within the paint booth and thus can be easily installed, removed so as to be replaced by a non-contaminated arrestor.

The shipping of such prior art arrestors is expensive because the bulk of the shipping volume consists of air spaces formed by the cellular structure of the paint arrestor as it is the cellular structure of the paint arrestor that assists greatly in the capture of the entrained paint.

It is an object of the invention to construct multi-ply, preferably two-ply, or more expandable filter media which, after fabrication, may be collapsed into a compact shipping form thereby reducing the volumetric shipping space required while, at the same time, allowing simple expansion of the filter media when ready for use as the replacement filter for existing filter panels or paint arrestors in paint filtering stations or the like.

Inherent to such novel construction is the fact that on expansion, the filter ply or run cross-sectional area of each open or partially open cell may be adjusted so as to be small and hence provide for greater cellular wall capture area for given volume of airflow and when in such small state, the filter media is susceptible to capturing, more efficiently, very small particles entrained in the airflow which passes therethrough. When particle size is larger, or when the volume of air to be passed through the media is to be increased, the filter media may be expanded whereupon the cross-sectional area of each cell of each ply is increased, thereby reducing the resistance to airflow.

It is a further object of the invention to provide a plurality of plys, each parallel to the other, with the axis of the cells of one ply oriented at an oblique angle $\phi$ relative to the medial axis of the filter ply or run housing or defining the cell and preferably $\phi$ is in the range of 15° and 30°. Thus cells in adjacent plys have the cell longitudinal axis oriented relative to each other at an angle $2\phi$ which is less than 90° and preferably in the range of 30° to 60°. This offset construction causes air passing through the filter media to change direction on leaving the family of cells of one ply and entering the adjacent family of cells of the next ply and encourages, thereby, the deposition of entrained air-borne materials onto the surfaces of the cells.

The invention will now be described by way of example with reference to the accompanying drawings in which:

FIG. 1 is a front elevational view of an embodiment of the invention in its expanded near operative position;

FIG. 2 is a perspective view of the filter according to FIG. 1 in its near fully collapsed on shipping state;

FIG. 3 is a perspective view of an alternative embodiment of the invention of FIGS. 1 and 2 and an alternative means of holding the filter media open.

FIG. 4 is cross-sectional view through the two plys of the filter of FIGS. 1 through 3.

FIG. 5 is a front elevational view of an embodiment in its collapsed position similar to that of FIG. 2 while

FIG. 7 is a front elevational view of the two-ply filter of FIG. 1 and 3 while

Figure 5:
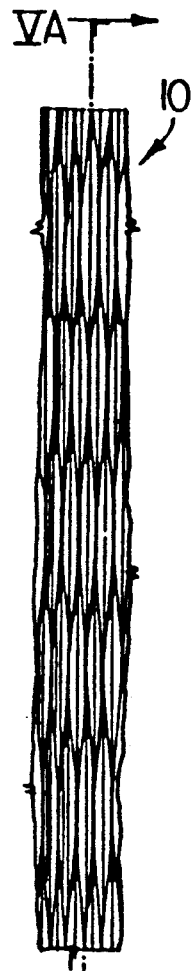
Figure 6:
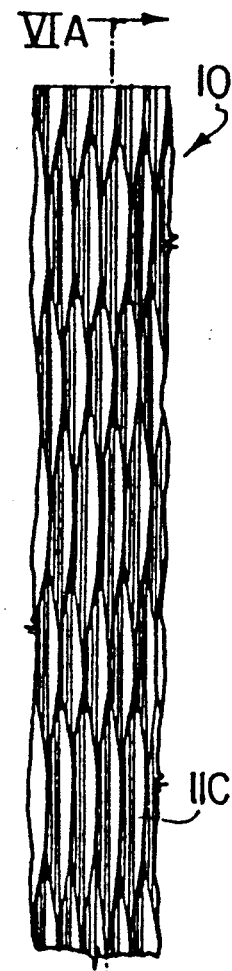
FIG. 6 is a cross-sectional view of an embodiment of the filter partially expanded and FIG. 6A is a cross-sectional view along lines 6A—6A of FIG. 6 being a two-ply filter.

Referring to FIG. 1, a paint arrestor 10, according to the invention contemplates a first family of obliquely oriented honeycomb cells plied as run 11 composed of juxtaposed individual honeycomb cells 11C, the run 11 being spaced at a predetermined distance 12 from a second family of similarly obliquely oriented honeycomb cells or as a run 13 housing honeycomb cells 13C, the relative longitudinal axis orientation of each of the family of cells 11C and 13C being no greater than orthogonal to each other and preferably relatively intersecting at an acute angle $2\phi$, as seen in FIG. 4, wherein $\phi$ is the angle between the longitudinal axis between each cell, 11C or 13C, and the median plane of the run 11 or 13 housing or defining such cells, ie. 11C or 13C respectively. Thus, the longitudinal axis, not shown, of each cell is parallel to the cell walls. Each of the obliquely oriented honeycomb cell runs can be fabricated according to the method of manufacturing "Filter Media", as disclosed by one of the co-inventors herein in his U.S. Pat. No. 3,949,651 issued 13 April, 1976 (Canadian Patent No. 993,375).

The interceding space 12 defined by the honeycomb runs 11 and 13, preferably varies between 0.6 cm and 2 cm. After fabrication of each run 11 and 13, their respective ends are glued to corrugated paperboard of approximately ⅛" thick (1.2 mm) or paperboard of approximately 1/16' thick (6 mm), the latter being fabricated from overlaying a plurality of 20 lb. craft paper sheets to the extent of seven or more layers and gluing each to form such paperboard, multi-ply sides 14 and 16. The inside margin of each side 14 and 16 is glued to each laterally expanded margin of the two runs 11 and 13.

In the embodiment of FIGS. 1 and 2, the multi-ply side 14 preferably extends at its upper and lower ends through respective bends B to form an upper movable upper flap 14T and a movable lower flap 14B. Similarly, side 16 has upper flap 16T and lower flap 16B. The longitudinal dimension of each flap of the top or bottom flaps 14T and 16T, and 14B and 16B, are the summation of the predetermined distance between the sides 14 and 16 when in the expanded and locked position of FIG. 1; thus, the respective distal ends of the top flaps 14T and 16T and the bottom flaps 14B and 16B abut.

In order to firmly hold the filter media 10 of FIGS. 1 and 2 in the fully open position, the top flaps 14T and 16T are folded toward each other over the top, as seen, to abut against each other; in a similar fashion, as shown, for the bottom flaps 14B and 16B. It is the abutment of the flaps "T" and "B" that hold the media in its expanded position for use.

Referring to the alternative embodiment of FIG. 3, flaps "T" and "B" are not needed and are dispensed with. Instead, in order to hold the same filter media 10 in the fully open position similar to FIG. 1, a closed loop wire rod frame F is sized so that its lateral sides S have a length of approximately the height of the filter media and the upper and lower runs, a length being approximately the width of the internal dimension of the filter 10. The wire sides S therefore urge against the inner margin of the ply sheet sides 14 and 16 and constrain the filter into the open position.

Figures 5A, 6A, 7A:
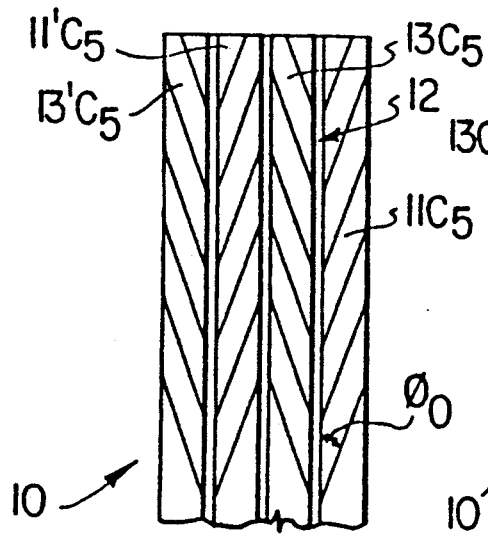
FIG. 5A is a section along lines 5A—5A of FIG. 5 illustrating a multi-ply embodiment.
FIG. 7A is a cross-sectional view of FIG. 7 along lines 7A—7A Omitting the Wire frame S.

Referring to FIGS. 1, 4, 7 and 7A, the same depict the embodiment of FIG. 1 in the open position with the cross-sectional FIGS. 4 and 7A being the same. The angle $\phi_3$ is the largest of the range of angles $\phi$, namely, $\phi_0$ through $\phi_3$ and in the embodiment of FIGS. 1, 7 and 7A, $\phi_3$ is 30°. If the filter of FIG. 1 is not extended to its full extent, but partially, the cells 11C$_6$ and 13C$_6$ each have the angle $\phi_1$ which is approximately 22°, while in the FIG. 5A, $\phi_0$ is approximately 15°.

The filter 10, in the embodiment of FIGS. 1, 2, 5, 6, and 7 may be constrained in any of the three positions therefore, or in any intermediate or other position by, and referring to FIGS. 2 and 1 by cutting the length of the movable tabs 14T and 14B, and 16T and 16B respectively; or, alternatively, as to the embodiment of FIG. 2, changing the dimensional size of the frame F.

Figure 9:
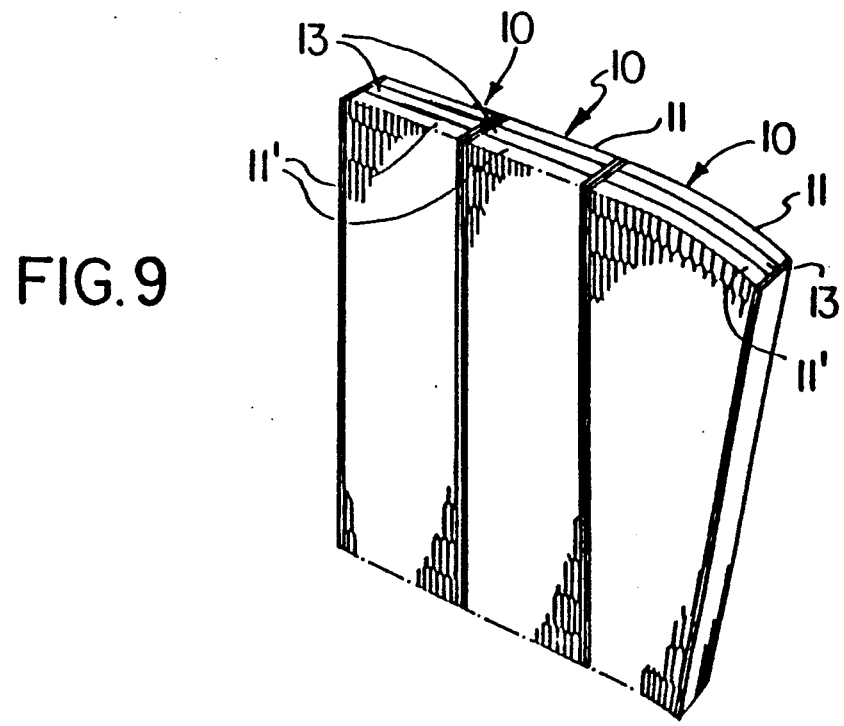
FIG. 9 is a perspective view illustratively of a number of three-ply filters being attached end to end so as to provide a filter of longer length.

Other means of constraining the filter to display a preferred cross-sectional area for the cells C, or for the angle $\phi$ will now be apparent to those skilled in the art. If the filter 10, as constructed, is not sufficiently long, and now referring to FIG. 9, several may be respectively glued along the side margins 14 and 16 against each other so as to provide a multi-length filter 10 as shown in FIG. 9; that filter illustrated being a three-ply rather than two-ply filter.

Figure 8:
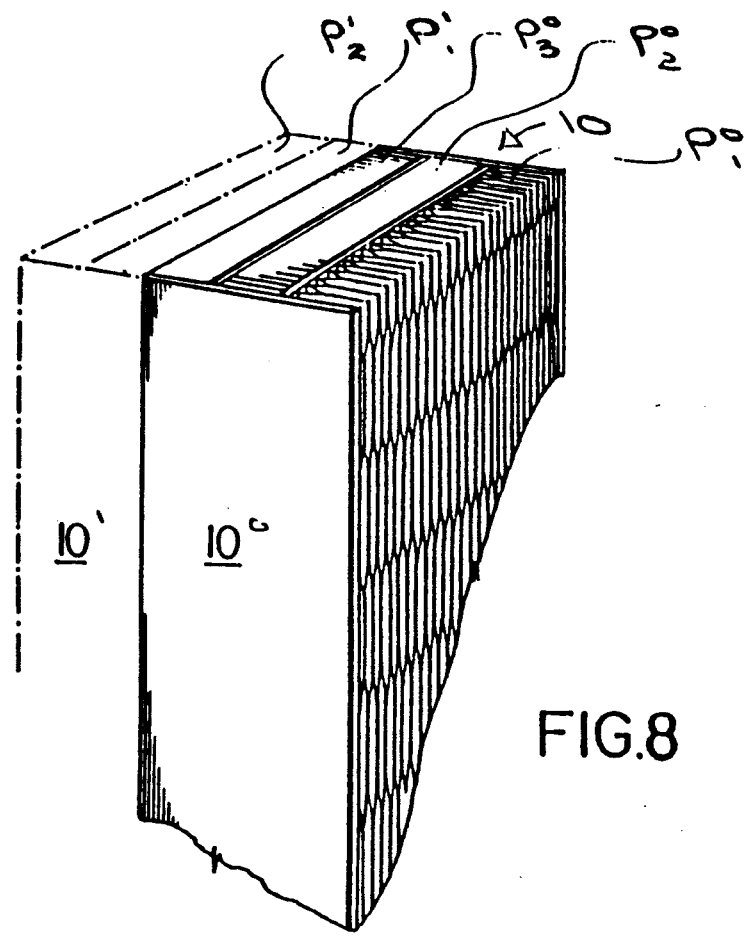
FIG. 8 is a perspective view of a compound filter, a three-ply filter juxtaposed to a two-ply filter.

In yet another embodiment, and referring to FIG. 8, ply banks may be placed against each other so that, for instance, a three-ply filter and consisting of plys $P^0{}_1$, $P^0{}_2$, and $P^0{}_3$, may be appropriately affixed to a ply bank consisting of a two-ply filter composed of $P'_1$ and $P'2$.

Figure 7:
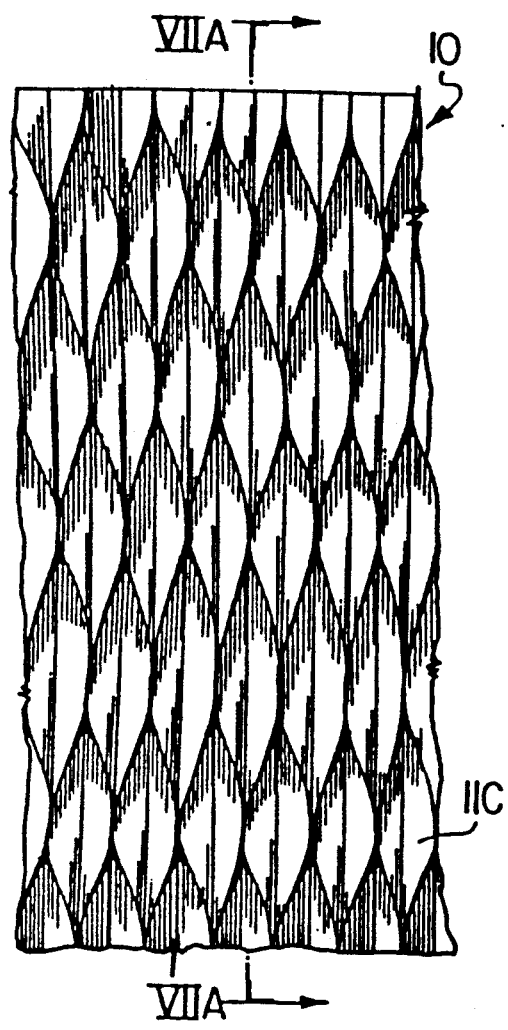

Because each of the cell walls, or axis of each cell, is at an acute angle $\phi$ relative to the medial plane of its run, and each run is parallel to each other and with the planar space 12 therebetween, in the preferred embodiment, when airflow passes through the filter 10, it goes through a change of direction at the boundary layer with the planar space 12 encouraging deposition of air entrained particles onto the cell C walls. Deposition is additionally enhanced either by changing of the cross-sectional area of each cell by reducing the width of the filter media 10, or expanding it to its fullest extent as seen in FIGS. 1 and 7; inherently with such change of cellular cross-sectional area is that the acute angle $\phi$ changes. It is be preferred that the change be constrained within the range of 15° to 30° so that 2$\phi$ is in the range of 30° to 60°. This offers optimal deposition of air entrained particles in most instances onto the cell walls. Additional efficiency may be obtained by putting an adhesive A, not clearly shown on the drawings, onto the surfaces each cell C of all the runs or plys P in any convenient manner.

I claim:

1. A multi-ply expandable filter media formed of obliquely oriented juxtaposed honeycomb cells defined by a ply or run of expandable honeycomb material, the run defining each of its juxtaposed cells with a longitudinal axis of each cell, parallel and oriented at a first acute angle relative to the axis of the run, with a next adjacent run arranged to define a relatively small interplanar space between said adjacent runs and wherein the longitudinal cell axis of the cells of each adjacent run are respectively at a second acute angle and means for clasping the filter media into a closed, compressed, transportable state, and when ready for use as a filter media, means adapted to allow the same to be expanded and pulled out and to be constrained into a predetermined open, expanded position.

2. The multi-ply expandable filter media, as claimed in claim 1 comprising:
    (a) at least two adjacently disposed runs of honeycomb material, each cell of which has its longitudinal axis oriented at an acute angle relative to the incremental median of the run;
    (b) means for holding the incremental loci of points of each run relatively substantially parallel; and,
    (c) means for constraining, each cell of each run into a predetermined cross-sectional area.

3. The multi-ply expandable filter media as claimed in claim 2, wherein the acute angle is within the preferred range of 30° to 60°.

* * * * *